Aug. 16, 1932.  W. BRETH  1,871,581
VALVE HOLDER FOR TUBE VULCANIZERS
Filed Jan. 21, 1932    2 Sheets-Sheet 1

INVENTOR
Walter Breth
BY
Evans & McCoy
ATTORNEYS

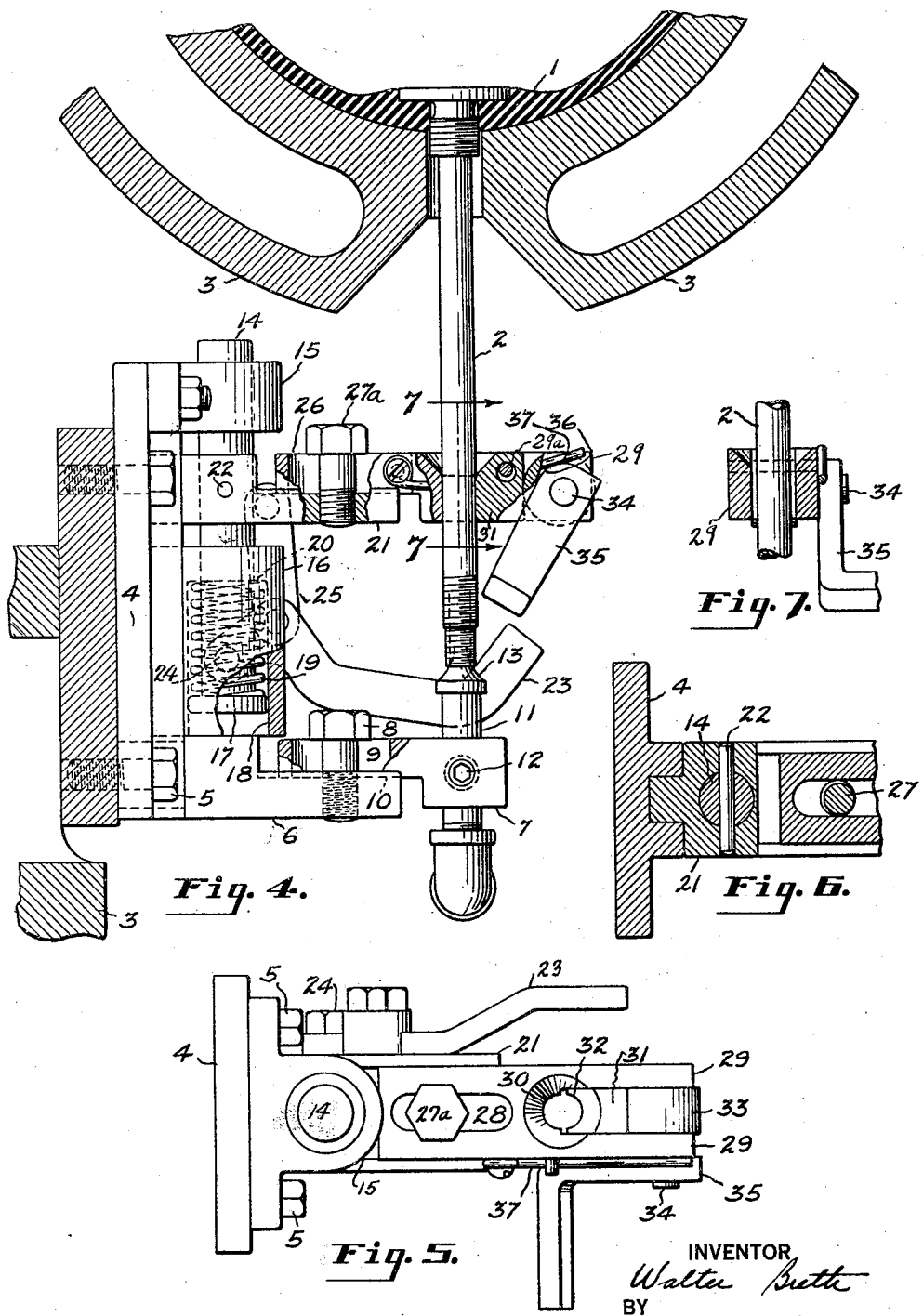

Patented Aug. 16, 1932

1,871,581

UNITED STATES PATENT OFFICE

WALTER BRETH, OF AKRON, OHIO, ASSIGNOR TO THE GENERAL TIRE & RUBBER COMPANY, OF AKRON, OHIO, A CORPORATION OF OHIO

VALVE HOLDER FOR TUBE VULCANIZERS

Application filed January 21, 1932. Serial No. 587,941.

This invention relates to vulcanizing apparatus and more particularly to apparatus for use in vulcanizing inner tubes for pneumatic tires.

One of the objects of the present invention is to provide a new and improved means for holding air valves of inner tubes for pneumatic tire casings during the vulcanizing operation of the tube.

Another object is to provide tube vulcanizing mechanism with simple and efficient means for rigidly holding the tube air valves and for maintaining an efficient connection between the air valve and source of air supply during the vulcanizing operation.

Another object is to provide tire tube vulcanizing appartus with a simple means for rigidly clamping an air valve and with means for quickly and easily connecting the air valve with the source of air supply, such means maintaining an efficient connection therebetween during the vulcanizing operation.

A further object is to provide tire tube vulcanizing apparatus with a new and improved clamp for holding an air valve against movement during the vulcanizing operation and with resiliently held mechanism for providing an efficient communication between the air valve and source of air supply.

With the above and other objects in view which will be apparent from the following detailed description, the present invention consists in certain features of construction and combinations of parts that will be readily understood by those skilled in the art to which the invention appertains.

In the drawings which illustrate a suitable embodiment of the present invention, Figure 1 is a view taken transversely of the axis of a tube vulcanizer showing the valve clamping means and the means for maintaining a connection between the air valve and source of air supply;

Fig. 4 is a side elevation similar to Fig. 2 but showing the apparatus in its operative position;

Fig. 5 is a plan view of the apparatus shown in Fig. 2;

Fig. 6 is a section taken on the line 6—6 of Fig. 2; and

Fig. 7 is a section taken on the line 7—7 of Fig. 4.

Referring to the accompanying drawings in which like numerals refer to like parts throughout the several views, the apparatus here shown is for use in vulcanizing inner tubes for pneumatic tires.

In the vulcanization of pneumatic tire tubes and other air containers, a constant pressure is maintained within the article during the vulcanizing operation, and for this purpose a tubular stem similar to the conventional stem of air valves used with inner tubes is employed for admitting air under pressure into the tube. As here used in the specification and claims, the term "stem" shall be understood to be any suitable tubular means for admitting air into the tube to be vulcanized. In order to maintain a constant air pressure within the tube, the stem is maintained in continuous communication with a source of air supply. It is apparent that an efficient means must be employed to maintain an efficient communication and therefore this means should be of such construction that it can be quickly and easly attached to and detached from the air stem of the tube.

The article selected for illustration in the present application is an inner tube 1 having a relatively long stem 2 through which air may be fed under pressure to the tube. The tube 1, as shown in Figs. 1 and 4, is shown positioned within the mold cavities formed by a pair of mating mold halves or sections 3, provision being made at the parting line of the mold section 3 for the reception of the stem 2.

Figure 1:
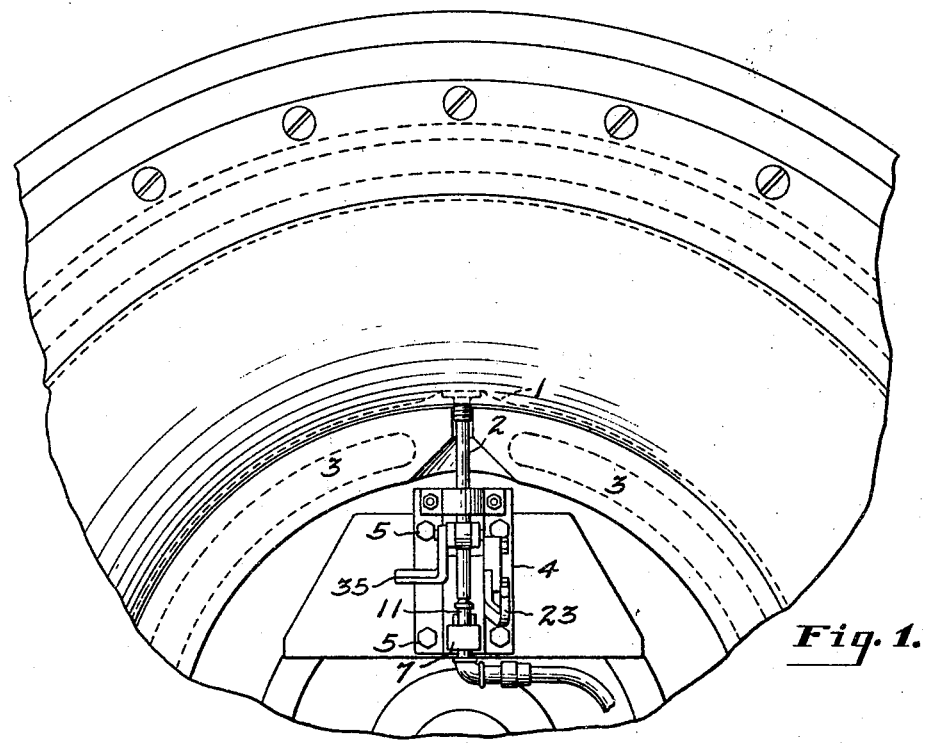

The apparatus of the present invention, as shown in Figs. 1 and 4, is preferably mounted on a bracket support 4 which is secured by a bolt 5 to one of the mold sections 3. The bracket support 4, however, may be otherwise mounted as long as it bears a definite fixed relation to the parting line of the mold section.

The support 4 is provided with a projecting arm 6 which may be integral with the support or may be separately secured in any suitable manner thereto. The arm 6 carries the slidable bracket 7 which is secured thereto by means of a cap screw 8 extending through an elongated slot 9 in the bracket 7. The bracket 7 and arms 6 are also provided with cooperating ways 10 so that the bracket 7 will have a slidable movement only. The bracket 7 forms the support for an air conduit 11 which may be clamped thereon in any suitable position by means of a cap screw 12. The conduit 11 extends upwardly through the bracket 7 and terminates in a conical nozzle 13 which is arranged to extend into the stem 2, as shown in Fig. 4, the nozzle 13 and stem having coacting surfaces which form an air-tight seal when the stem is held securely against the nozzle. It is obvious that by loosening the cap screw 8 the bracket 7 may be moved longitudinally of the arm to bring the axis of the nozzle 13 into axial alignment with the axis of the stem 2.

Figure 2:
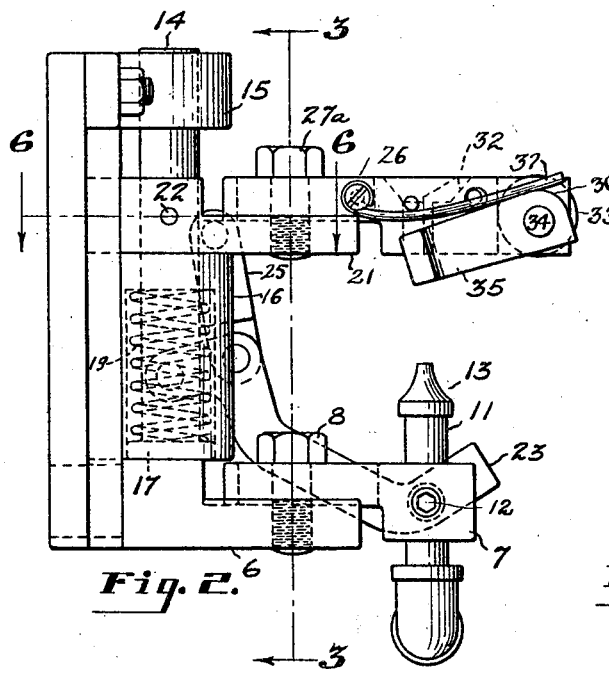
Fig. 2 is an enlarged side elevation of such clamping and connection means showing the same in inoperative position.
Figure 3:
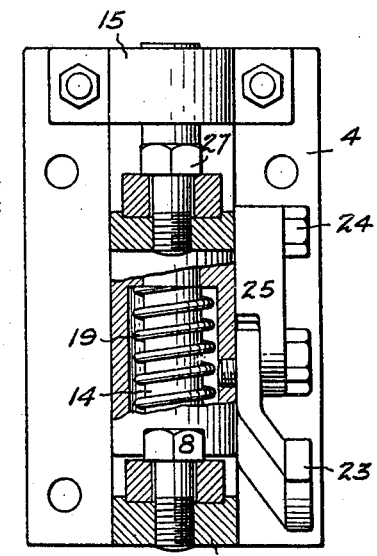
Fig. 3 is a section taken approximately on the line 3—3 of Fig. 2.

The support 4 also carries mechanism for securely clamping the stem 2 and forcing the same firmly against the nozzle 13. This mechanism comprises a vertically movable guide post 14 which is guided at its upper end by a journal 15 secured to the support 4. The post 14 extends into the lower guide 16 carried by the support 4 and terminates in an enlarged head portion 17 which is guided within the enlarged bore 18 that is formed at the lower end of the guide 16 and which normally seats against the arm 6, as shown in Fig. 2. A coiled compression spring 19 is positioned within the enlarged bore 18 in such a manner that one end thereof seats against the shoulder 20 at the upper end of the guide 16, and the other end seats against the enlarged head portion 17 of the post 14, thereby causing the post 14 to be resiliently urged toward the arm 6 for a purpose to be later described.

An arm 21 is rigidly secured to the post 14 by means of a pin 22 intermediate the guide 16 and journal 15 and extends outwardly above the arm 6.

The post 14, as previously described, is vertically movable, and this is accomplished by means of linkage comprising an actuating lever 23 pivoted by means of a cap screw 24 to the guide 16, and a link 25 pivoted at one end to the lever 23 and at its upper end to the arm 21. By moving the lever 23 upwardly the link 25 exerts an upward pressure on the post 14, and raises the same, which causes the spring 19 to compress, with the result that when the lever 23 is released the compressed spring 19 urges the post 14 downwardly.

A clamp device 26 is mounted on the arm 21 in the same manner as the lower bracket 7 by means of a cap screw 27ª extending through an elongated opening 28 in the device 26 and threaded into the arm 21, as shown in Fig. 4.

The device 26 is also guided on the arm 21 for longitudinal movement only and is bifurcated at its end to provide a pair of spaced legs 29, the base of the bifurcations being semi-circular to form a transverse seat 30 for engagement with one side of the stem 2. A slidable clamp 31 is positioned between the legs 29 and guided by means of a pin 29ª, and likewise is formed with a semi-circular seat 32 for engagement with the opposite side of the stem 2. The clamp is actuated by means of an eccentric cam 33 positioned between the legs 29 and rigidly secured to a transverse pivot pin 34. The pin 34 is rotated by means of a lever 35 rigidly secured thereto so that upon counter-clockwise movement of the lever 35, as viewed in Fig. 4, the cam 33 will force the clamp 31 inwardly to rigidly clamp the cam 2 against the semi-circular seat 30. A portion of the lever 35 is rounded at 36 and a flat spring 37 is positioned to continuously bear against the rounded portion so that when the clamp 31 is retracted, as in Fig. 2, the frictional engagement of the spring against the rounded portion will prevent the weight of the lever 37 from inadvertently actuating the cam 33.

The operation of the device described is as follows: In normal inoperative position as shown in Fig. 2 the clamp 31 is retracted, the flat spring 37 holding the eccentric 33 in non-clamping position, and furthermore the post 14, and therefore the attached clamping device, is in its lowermost position. The inner tube 1 is placed in the cavity of one of the mold sections 3 with the stem or so-called valve 2 extending downwardly between the semi-circular seats 30 and 32 into a position overlying and coaxial with the nozzle 13 of the air conduit 11 approximately as shown in Fig. 1.

The lever 23 is then lifted upwardly, thereby moving the clamping device upwardly relative to the stem 2 and depressing the spring 19, and when the desired position is obtained the lever is moved downwardly, causing the eccentric 33 to move the clamp inwardly and rigidly clamp the stem 2 between the semi-circular seats 30 and 32. The lever 23 is then released and as the result thereof the spring 19 forces the post 14 downwardly to force the stem 2 while clamped against the conical face of the nozzle 13, as shown in Fig. 4. It will be noted that when the device is in clamping position the head portion 17 is free of engagement with the arm 6 so that, during the ensuing time and until the clamp is released, the spring 19 causes the stem to have secure and efficient sealed contact with the nozzle 13.

This provides a means whereby, during the vulcanizing operation, the tube 1 is in continuous communication with the source of air supply through the stem 2 without liability of leakage or breakage of the seal that is maintained between the nozzle and the stem. The advantages of such a construction, such as efficiency, economy in time and labor, are readily apparent.

Furthermore, it is to be understood that the particular forms of apparatus shown and described, and the particular procedure set forth, are presented for purposes of explanation and illustration and that various modifications of said apparatus and proceedure can be made without departing from my invention as defined in the appended claims.

What I claim is:

1. In a vulcanizing device having mating mold sections to receive an endless rubber tube therebetween to be vulcanized, said tube having a fluid inlet stem extending from between said sections, a rigidly mounted fluid conduit positioned in substantially axial alignment with said stem, movable means for rigidly clamping said stem, and resilient means to axially move said stem toward said conduit and resiliently hold the open end of said stem against the discharge end of said conduit whereby fluid may flow from said conduit through said stem and into said tube.

2. In a vulcanizing device having mating mold sections to receive an endless rubber tube therebetween to be vulcanized, said tube having a fluid inlet stem extending from between said sections, a rigidly mounted fluid conduit positioned in substantially axial alignment with said stem, movable means for rigidly clamping said stem, and resilient means to axially move said stem toward said conduit and resiliently hold the open end of said stem against the discharge end of said conduit whereby fluid may flow from said conduit through said stem and into said tube, the discharge end of said conduit being conical to fit within said stem and form a seal therewith.

3. In a vulcanizing device having mating mold sections to receive an endless rubber tube therebetween to be vulcanized, said tube having a fluid inlet stem extending from between said sections, a rigidly mounted fluid conduit positioned in substantially axial alignment with said stem, a clamp to securely engage said stem, a movable support for said clamp and a spring acting with said support to place said stem held by said clamp in communication with said conduit and resiliently hold said stem against said conduit.

4. In a vulcanizing device having mating mold sections to receive an endless rubber tube therebetween to be vulcanized, said tube having a fluid inlet stem extending from between said sections, a rigidly mounted fluid conduit positioned in substantially axial alignment with said stem, a clamp to securely engage said stem, a movable support for said clamp and a spring acting with said support to place said stem held by said clamp in communication with said conduit and resiliently hold said stem against said conduit, said stem and clamp having coacting surfaces to provide a seal therebetween whereby fluid may flow from said conduit through said stem and into said tube.

5. In a vulcanizing device having mating mold sections to receive an endless rubber tube therebetween to be vulcanized, said tube having a fluid inlet stem extending from between said sections, a rigidly mounted fluid conduit positioned in substantially axial alignment with said stem, a movable member, spring means normally urging said member toward said conduit, an actuating means for moving said member away from said conduit against the resistance of said spring means, and clamping means carried by said member for securely clamping said stem while said member is away from said conduit, whereby upon release of said actuating means said spring means will resiliently force the open end of said stem against the discharge end of said conduit.

6. In a vulcanizing device having mating mold sections to receive an endless rubber tube therebetween to be vulcanized, said tube having a fluid inlet stem extending from between said sections, a rigidly mounted fluid conduit positioned in substantially axial alignment with said stem, a movable member, spring means normally urging said member toward said conduit, an actuating means for moving said member away from said conduit against the resistance of said spring means, and clamping means carried by said member for securely clamping said stem while said member is away from said conduit, whereby upon release of said actuating means said spring means will resiliently force the open end of said stem against the discharge end of said conduit, said open end of said stem and discharge end of said conduit having overlapping surfaces to form a seal and establish communication therebetween.

7. In a vulcanizing device having mating mold sections to receive an endless rubber tube therebetween to be vulcanized, said tube having a fluid inlet stem extending from between said sections, a rigidly mounted fluid conduit positioned in substantially axial alignment with said stem, a movable member having a stem engaging seat for engaging one side of said stem, a clamping member carried by said movable member and having a stem engaging seat for engaging the other side of said stem, spring means normally urging said movable member toward said conduit, actuating means for moving said movable member away from said conduit against the resistance of said spring and longitudinally of said stem, and means for moving said clamping member into clamping engagement with said stem whereby upon release of said actuating means said spring means will resiliently urge the open end of said stem against the discharge end of said conduit.

8. In a vulcanizing device having mating mold sections to receive an endless rubber tube therebetween to be vulcanized, said tube having a fluid inlet stem extending from between said sections, a rigidly mounted fluid conduit positioned in substantially axial alignment with said stem, a movable member having a stem engaging seat for engaging one side of said stem, a clamping member carried by said movable member and having a stem engaging seat for engaging the other side of said stem, spring means normally urging said movable member toward said conduit, actuating means for moving said movable member away from said conduit against the resistance of said spring and longitudinally of said stem, and means for moving said clamping member into clamping engagement with said stem whereby upon release of said actuating means said spring means will resiliently urge the open end of said stem against the discharge end of said conduit, said open end of said stem and discharge end of said conduit having overlapping surfaces to form a seal and establish communication therebetween.

9. In a vulcanizing device having mating mold sections to receive an endless rubber tube therebetween to be vulcanized, said tube having a fluid inlet stem extending from between said sections, a rigidly mounted fluid conduit positioned in substantially axial alignment with said stem, a movable member having a stem engaging seat for engaging one side of said stem, a clamping member carried by said movable member and having a stem engaging seat for engaging the other side of said stem, spring means normally urging said movable member toward said conduit, actuating means for moving said movable member away from said conduit against the resistance of said spring and longitudinally of said stem, and a cam for moving said clamping member into clamping engagement with said stem whereby upon release of said actuating means said spring means will resiliently urge the open end of said stem against the discharge end of said conduit.

10. In a vulcanizing device having mating mold sections to receive an endless rubber tube therebetween to be vulcanized, said tube having a fluid inlet stem extending from between said sections, a rigidly mounted fluid conduit positioned in substantially axial alignment with said stem, a movable member having a stem engaging seat for engaging one side of said stem, a clamping member carried by said movable member and having a stem engaging seat for engaging the other side of said stem, spring means normally urging said movable member toward said conduit, actuating means for moving said movable member away from said conduit against the resistance of said spring and longitudinally of said stem, and a cam for moving said clamping member into clamping engagement with said stem whereby upon release of said actuating means said spring means will resiliently urge the open end of said stem against the discharge end of said conduit, said open end of said stem and discharge end of said conduit having overlapping surfaces to form a seal and establish communication therebetween.

In testimony whereof I affix my signature.

WALTER BRETH.